(12) United States Patent
Piao et al.

(10) Patent No.: US 12,476,252 B2
(45) Date of Patent: Nov. 18, 2025

(54) GLOBULAR CARBON-BASED ANODE ACTIVE MATERIAL, METHOD FOR MANUFACTURING SAME, AND ANODE AND LITHIUM SECONDARY BATTERY COMPRISING SAME

(71) Applicant: LG ENERGY SOLUTION, LTD., Seoul (KR)

(72) Inventors: Lilin Piao, Daejeon (KR); Sang-Wook Woo, Daejeon (KR); Je-Young Kim, Daejeon (KR); Hyun-Chul Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 839 days.

(21) Appl. No.: 17/766,107

(22) PCT Filed: Sep. 29, 2020

(86) PCT No.: PCT/KR2020/013428
§ 371 (c)(1),
(2) Date: Apr. 1, 2022

(87) PCT Pub. No.: WO2021/066581
PCT Pub. Date: Apr. 8, 2021

(65) Prior Publication Data
US 2022/0376250 A1    Nov. 24, 2022

(30) Foreign Application Priority Data
Oct. 4, 2019 (KR) .................. 10-2019-0123399

(51) Int. Cl.
| | |
|---|---|
| *H01M 4/587* | (2010.01) |
| *H01M 4/04* | (2006.01) |
| *H01M 10/0525* | (2010.01) |
| *H01M 4/02* | (2006.01) |

(52) U.S. Cl.
CPC ......... *H01M 4/587* (2013.01); *H01M 4/0404* (2013.01); *H01M 10/0525* (2013.01); *H01M 2004/027* (2013.01)

(58) Field of Classification Search
CPC .............. H01M 4/587; H01M 4/0404; H01M 10/0525; H01M 2004/027; H01M 4/362; H01M 4/625; H01M 4/133

USPC ................................................... 429/231.95
See application file for complete search history.

(56) References Cited

U.S. PATENT DOCUMENTS

| | | | |
|---|---|---|---|
| 7,781,103 B2 | 8/2010 | Sheem et al. | |
| 8,728,668 B2 | 5/2014 | Kawai et al. | |
| 8,993,170 B2 | 3/2015 | Yue et al. | |
| 2004/0151837 A1 | 8/2004 | Morita et al. | |
| 2009/0136849 A1* | 5/2009 | Yue .................... | H01M 4/1393 427/77 |
| 2014/0356707 A1 | 12/2014 | Kwon et al. | |
| 2018/0013146 A1* | 1/2018 | Yamada ................ | H01M 4/587 |

FOREIGN PATENT DOCUMENTS

| | | |
|---|---|---|
| JP | 2002-348109 A | 12/2002 |
| JP | 2004-196609 A | 7/2004 |
| JP | 5215173 B2 | 6/2013 |
| JP | 2014-60168 A | 4/2014 |
| JP | 2014-146607 A | 8/2014 |
| JP | 2015-53291 A | 3/2015 |
| KR | 10-2002-0042586 A | 6/2002 |
| KR | 10-2005-0099697 A | 10/2005 |
| KR | 10-1310300 B1 | 9/2013 |
| KR | 10-1417588 B1 | 7/2014 |
| KR | 10-2014-0140323 A | 12/2014 |
| KR | 10-2014-0140952 A | 12/2014 |
| KR | 10-2018-0127213 A | 11/2018 |

OTHER PUBLICATIONS

International Search Report for PCT/KR2020/013428 mailed on Jan. 22, 2021.

* cited by examiner

*Primary Examiner* — Nicholas A Smith
*Assistant Examiner* — Kevin Nguyen
(74) *Attorney, Agent, or Firm* — Birch, Stewart, Kolasch & Birch, LLP

(57) ABSTRACT

A spheronized carbonaceous negative electrode active material and a method of preparing a spheronized carbonaceous negative electrode active material, which has an average particle diameter ($D_{50}$) of 8.5-10.5 μm, a minimum particle diameter ($D_{min}$) of 2.3 μm or more, and a tap density of 1.00-1.20 g/cc.

12 Claims, No Drawings

GLOBULAR CARBON-BASED ANODE ACTIVE MATERIAL, METHOD FOR MANUFACTURING SAME, AND ANODE AND LITHIUM SECONDARY BATTERY COMPRISING SAME

TECHNICAL FIELD

The present disclosure relates to a spheronized carbonaceous negative electrode active material, a method for preparing the same, and a negative electrode and a lithium secondary battery including the same. More particularly, the present disclosure relates to a spheronized carbonaceous negative electrode active material having reduced internal pores and an improved sphericity, a method for preparing the same, and a negative electrode and a lithium secondary battery including the same.

The present application claims priority to Korean Patent Application No. 10-2019-0123399 filed on Oct. 4, 2019 in the Republic of Korea, the disclosures of which are incorporated herein by reference.

BACKGROUND ART

As technical development and needs for mobile instruments have been increased, secondary batteries as energy sources for such mobile instruments have been increasingly in demand. Among such secondary batteries, lithium secondary batteries having high energy density and operating voltage, long cycle life and a low discharge rate have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying slurry including an active material, a binder and a conductive material dispersed in a solvent to a current collector, followed by drying and pressing.

Lithium metal has been used to date as a negative electrode of a secondary battery. However, since it was known that lithium metal causes a short-circuit in a battery due to lithium dendrite formation, resulting in a risk of explosion, it has been substituted with a carbonaceous compound capable of reversible lithium ion intercalation/deintercalation and maintaining structural and electrical properties.

Such a carbonaceous compound has a significantly low discharge potential of about −3V based on the standard hydrogen electrode potential, and shows excellent electrode cycle life by virtue of significantly reversible charge/discharge behaviors derived from the monoaxial alignability of a graphene layer. In addition, the carbonaceous compound shows an electrode potential of 0V Vs. $Li/Li^+$ upon Li ion intercalation, which is substantially similar to the electrode potential of pure lithium metal. Therefore, when lithium metal forms a battery in combination with an oxide-based positive electrode, higher energy can be obtained advantageously.

Various types of carbonaceous materials, including artificial graphite, natural graphite and hard carbon, have been used as the carbonaceous compounds. Among the carbonaceous compounds, graphite is most widely used currently.

Among various types of graphite, natural graphite is used, after it is converted into graphite having a smooth surface shape through a post-treatment process, such as a spheronization process, in order to reduce irreversible reaction and to improve the processability of an electrode. In addition, when natural graphite is surface coated through the heat treatment of low-crystalline carbon, such as pitch, it is possible to prevent the edge surface of graphite from being exposed directly, to prevent destruction caused by an electrolyte, and to reduce irreversible reaction. The method for preparing a negative electrode active material by coating spherical natural graphite with low-crystalline carbon is used by the manufacturers of negative electrode materials.

However, the negative electrode active material obtained by the above-mentioned method is one prepared by spheronization of natural graphite having a scaly particle shape, and the spheronized graphite particles include a large amount of voids therein. Such voids reduce the density of a negative electrode active material, thereby making it difficult to manufacture a high-density negative electrode plate. In addition, since the low-crystalline carbon coating film is broken during a process of densifying a negative electrode active material on a current collector, the graphite edge surface is exposed, resulting in the problems of destruction caused by an electrolyte and irreversible reaction.

Further, natural graphite has a disadvantage of higher electrode swelling as compared to artificial graphite. Moreover, the internal pores generated during the spheronization of natural graphite are larger than the pores of artificial graphite, and the resultant coating film layer causes the problems of gas generation derived from side reactions at high temperature through such a larger amount of internal pores, and degradation of high-temperature storage characteristics.

DISCLOSURE

Technical Problem

The present disclosure is designed to solve the problems of the related art, and therefore the present disclosure is directed to providing a spheronized carbonaceous negative electrode active material having reduced internal pores and an improved sphericity, a method for preparing the same, and a negative electrode and lithium secondary battery including the same.

The present disclosure is also directed to providing a negative electrode including the negative electrode active material and a lithium secondary battery including the same.

Technical Solution

According to the present disclosure, there are provided a spheronized carbonaceous negative electrode active material, a method for preparing the same, and a negative electrode and lithium secondary battery including the same according to the following embodiments.

According to the first embodiment of the present disclosure, there is provided a spheronized carbonaceous negative electrode active material, which has an average particle diameter ($D_{50}$) of 8.5-10.5 μm, a minimum particle diameter ($D_{min}$) of 2.3 μm or more, and a tap density of 1.00-1.20 g/cc.

According to the second embodiment of the present disclosure, there is provided the spheronized carbonaceous negative electrode active material as defined in the first embodiment, which has an average particle diameter ($D_{50}$) of 8.5-10 μm.

According to the third embodiment of the present disclosure, there is provided the spheronized carbonaceous negative electrode active material as defined in the first or the second embodiment, which has a minimum particle diameter ($D_{min}$) of 2.3-3.5 μm.

According to the fourth embodiment of the present disclosure, there is provided the spheronized carbonaceous negative electrode active material as defined in any one of the first to the third embodiments, which has a tap density of 1.04-1.20 g/cc.

According to the fifth embodiment of the present disclosure, there is provided the spheronized carbonaceous negative electrode active material as defined in any one of the first to the fourth embodiments, which has a sphericity of 0.82-0.98.

According to the sixth embodiment of the present disclosure, there is provided a method for preparing the spheronized carbonaceous negative electrode active material as defined in the first embodiment, including the steps of:

spheronizing scaly graphite to prepare spheronized granulated particles;

carrying out cold isostatic pressing of the spheronized granulated particles to form cold static pressed spheronized granulated particles;

disintegrating the cold isostatic pressed spheronized granulated particles; and mixing the disintegrated spheronized granulated particles with pitch to form a mixture, and carbonizing the mixture at a temperature ranging from 1,400° C. to 600° C. to form a carbon coating on the disintegrated spheronized granulated particles.

According to the seventh embodiment of the present disclosure, there is provided the method as defined in the sixth embodiment, wherein the scaly graphite is crudely pulverized scaly graphite obtained by pulverizing scaly graphite having an average particle diameter of 9.5-300 μm.

According to the eighth embodiment of the present disclosure, there is provided the method as defined in the sixth or the seventh embodiment, wherein the pitch is used in an amount of 1-10 parts by weight based on 100 parts by weight of the disintegrated spheronized granulated particles.

According to the ninth embodiment of the present disclosure, there is provided a negative electrode including a current collector, and a negative electrode active material layer on at least one surface of the current collector, wherein the negative electrode active material layer includes the spheronized carbonaceous negative electrode active material as defined in any one of the first to the fifth embodiments.

According to the tenth embodiment of the present disclosure, there is provided a lithium secondary battery including the negative electrode as defined in the ninth embodiment.

Advantageous Effects

According to an embodiment of the present disclosure, scaly graphite is spheronized, the spheronized particles are subjected to a step (cold isostatic pressing) of reducing the internal pores of particles by applying external pressure uniformly to the particles, the cold isostatic pressed particles are coated with pitch, and then carbonized at high temperature. In this manner, it is possible to provide a spheronized carbonaceous negative electrode active material having reduced internal pores. When applying the negative electrode active material to a negative electrode of a secondary battery, it is possible to provide a secondary battery which shows reduced internal stress and improved swelling characteristics, and has a high capacity retention during storage at high temperature.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided a spheronized carbonaceous negative electrode active material, which has an average particle diameter ($D_{50}$) of 8.5-10.5 μm, a minimum particle diameter ($D_{min}$) of 2.3 μm or more, and a tap density of 1.00-1.20 g/cc.

According to an embodiment of the present disclosure, the spheronized carbonaceous negative electrode active material may be obtained by the above-mentioned method for preparing a spheronized carbonaceous negative electrode active material.

The spheronized carbonaceous negative electrode active material may have an average particle diameter ($D_{50}$) of 8.5-10.5 μm. According to an embodiment of the present disclosure, the spheronized carbonaceous negative electrode active material may have an average particle diameter of 8.5-10 μm.

The spheronized carbonaceous negative electrode active material may have a minimum particle diameter ($D_{min}$) of 2.3 μm or more. According to an embodiment of the present disclosure, the spheronized carbonaceous negative electrode active material may have a minimum particle diameter of 2.3-3.5 μm, 2.7-3.0 μm, or 2.8-3.0 μm.

Herein, the minimum particle diameter ($D_{min}$) refers to the smallest particle diameter that can be determined by using a particle size distribution analyzer. In addition, $D_{50}$ means the particle diameter at the point of 50% in the accumulation curve of particle size distribution plotted based on the total weight of the negative electrode active material, taken as 100%.

The average particle diameter may be determined by using the laser diffraction method or scanning electron microscopy (SEM) images, but is not limited thereto. The laser diffraction method generally allows determination of a particle diameter ranging from a submicron region to several millimeters (mm) and provides results with high reproducibility and high resolution. Particularly, powder to be analyzed is dispersed in a dispersion medium and introduced to a commercially available laser diffraction particle size analyzer (e.g. Microtrac S3500) to measure a difference in diffraction pattern depending on particle size, when the particles pass through laser beams, and then particle size distribution can be calculated. Then, $D_{min}$ may be determined by calculating the particle diameter at the point of the minimum particle diameter in the particle number accumulated distribution depending on particle diameter in the analyzer system, and the average particle diameter, $D_{50}$, may be determined by calculating the particle diameter at the point of 50% in the particle number accumulated distribution.

According to an embodiment of the present disclosure, when the negative electrode active material has an average particle diameter ($D_{50}$) of 8.5-10.5 μm and a minimum particle diameter ($D_{min}$) of 2.3 μm or more, it has a smaller particle diameter as compared to conventionally used natural graphite to provide improved output, rapid charge, swelling and high-temperature storage characteristics.

The negative electrode active material has a tap density of 1.00-1.20 g/cc. According to an embodiment of the present disclosure, the negative electrode active material has a tap density of 1.04-1.20 g/cc. The tap density may be analyzed by using a tap density measuring instrument, such as SEISHIN TAPDENSER KYT-400, or the like.

When the tap density satisfies the above-defined range, slurry mixing is facilitated, a desired thickness can be obtained even under pressing with a low pressure to reduce stress applied to an electrode, resulting in improved swelling characteristics, internal deformation of an electrode or cracking and side reactions caused by excessive pressing can be reduced, and the problem of low initial efficiency of a negative electrode can be solved.

The spheronized carbonaceous negative electrode active material may have a sphericity of 0.82-0.98, or 0.88-0.92.

The sphericity may be a value obtained by dividing the circumference of a circle having the same area as the projected image of the negative electrode active material by the circumferential length of the projected image, and particularly, may be represented by the following Mathematical Formula 1. The sphericity may be determined by using a particle shape analyzer, such as Sysmex FPIA3000 available from Malvern Co.

$$\text{Sphericity} = \text{Circumference of circle having the same area as projected image of active material/Circumferential length of projected image} \quad [\text{Mathematical Formula 1}]$$

In another aspect of the present disclosure, there is provided a method for preparing a spheronized carbonaceous negative electrode active material, including the steps of:

spheronizing scaly graphite to prepare spheronized granulated particles;

carrying out cold isostatic pressing of the spheronized granulated particles;

disintegrating the cold isostatic pressed spheronized granulated particles; and mixing the disintegrated spheronized granulated particles with pitch, and carbonizing the resultant product at a temperature of 1,400-1,600° C. to perform carbon coating.

When spheronization is carried out by using scaly graphite alone according to the related art, a large amount of internal pores are generated in the spheronized particles and side reactions occur in such internal pores. To solve the above-mentioned problem, spheronization is carried out, after spheronizing crudely pulverized scaly graphite having a small particle diameter of 15 µm or less, particularly 9-15 µm, coating the spheronized scaly graphite with pitch, and carbonizing the resultant product at high temperature, according to the present disclosure. In this manner, the present disclosure is directed to providing a spheronized carbonaceous negative electrode active material which has reduced internal pores and an improved sphericity, inhibits electrode swelling, when being used for an electrode of a battery, and provides improved high-temperature storage characteristics to a battery.

Hereinafter, each step of the method will be explained in detail.

First, scaly graphite is spheronized to prepare spheronized granulated particles.

The scaly graphite may be crudely pulverized scaly graphite obtained by pulverizing scaly graphite having an average particle diameter of 9.5-300 µm. The obtained crudely pulverized scaly graphite may have a small average particle diameter of 15 µm or less, or 9-15 µm.

According to an embodiment of the present disclosure, the crudely pulverized scaly graphite may have an average particle diameter of 9.5-300 µm, 9.7-100 µm, or 9.8-10 µm. When the average particle diameter of the crudely pulverized scaly graphite satisfies the above-defined range, it is possible to improve output characteristics and negative electrode swelling characteristics.

In this step, scaly graphite having an average particle diameter of 15 µm or less is used as a starting material and subjected to a spheronization process generally known to those skilled in the art, such as application of mechanical treatment, including impact compression, friction or shear force. The mechanical treatment may be carried out by using a spheronization device generally known to those skilled in the art, and particular examples of such devices include a mill, such as a counter jet mill (Hosokawa Micron, JP), ACM pulverizer (Hosokawa Micron, JP) or a current jet (Nissin, JP), a particle assembler, such as SARARA (Kawasaki Heavy Industries, Ltd., JP), GRANUREX (Freund Corporation, JP), New-Gra Machine (Seishin, JP) or Acromaster (Kosokawa Micron, JP), a kneader, such as a dispersion kneader or a two-roll, a compression shear processing device, such as a mechano-micro system, an extruder, a ball mill, a planetary mill, a mechano-fusion system, Nobilta, a hybridization or a rotary ball mill, or the like.

According to an embodiment of the present disclosure, the crudely pulverized scaly graphite having an average particle diameter of 15 µm or less is introduced to a spheronization device to which mechanical shear force is applied to form assembled particle cores, and then spheronized granulated particles having one or more surface layers stacked on and bound spherically to the surface portions of the assembled particle cores in the concentric circular direction may be formed. The assembled particle cores and the surface layers are formed at the same time, thereby forming spheronized granulated particles.

According to an embodiment of the present disclosure, a rotary processing machine is used to process the scaly graphite repeatedly to obtain spheronized granulated particles. As a result of repeated rotation, scaly graphite forms assembled particles through the pulverization caused by the collision and friction between the scaly graphite and the inner surface of the processing machine, shear processing caused by shear stress, or the like. Finally, spheronized granulated particles can be obtained. Herein, the pulverization time and rate may be controlled within an adequate range depending on the amount of graphite introduced to the machine.

In addition, this step may further include a step of isotropically pressurizing the resultant spheronized granulated particles to improve the contactability among the scaly graphite particles contained in the spheronized granulated particles.

Herein, 'isotropically pressurizing' refers to uniformly pressurizing the spheronized granulated particles three-dimensionally. To carry out isotropic pressurization of the spheronized granulated particles, water or argon may be used as a medium at room temperature, or cold isotropic pressurization may be carried out at room temperature.

In addition, although there is no particular limitation in the pressure applied during the isotropic pressurization of the spheronized granulated particles, a pressure of 50-150 Mpa is preferred and a pressure of 70-120 Mpa is more preferred. The term 'scaly graphite' refers to natural graphite having a scaly particle shape and may be obtained by pulverizing natural graphite having a scaly shape, a plate-like shape, a crushed shape, a tablet-like shape, etc. into a desired particle size.

Next, the spheronized granulated particles are subjected to cold isostatic pressing (cold isotropic press molding).

The cold isostatic pressing is a kind of method for pressing modified particles isotropically by using a pressurizing medium, such as gas, liquid, or the like, and a method for isotropically pressurizing particles by using water or argon as a pressurizing medium at room temperature.

When using the cold isostatic pressing method as a method for molding the spheronized granulated particles, it is possible to apply pressure isotropically from the all directions to the raw material particles. Therefore, the raw material particles in the spheronized granulated particles are oriented isotropically, while the internal pores in the particles are reduced. The structure of the negative electrode active material obtained by carbonizing the spheronized granulated particles subsequently shows optical isotropy. Thus, when a negative electrode is manufactured by using graphite particles obtained by pulverizing the negative electrode active material and coating the resultant product with carbon, crystallites are oriented relatively randomly to allow lithium ion intercalation/deintercalation in all directions, resulting in improvement of rapid charge/discharge characteristics.

The pressure of the press molding is not particularly limited, but may be 40-150 MPa, or 50-120 MPa. When the pressure satisfies the above-defined range, it is possible to reduce the internal pores in the graphite particles most effectively and to reduce the alignability of the graphite particles and electrode. It is also possible to reduce the specific surface area of the active material and that of the electrode, and thus to reduce undesired side reactions. As a result, lithium ion intercalation/deintercalation is facilitated to provide improved rapid charge/discharge characteristics, and degradation of coulombic efficiency upon the first charge/discharge, caused by an excessive increase in specific surface area of the product obtained from the pressing, can be prevented.

Then, the cold isostatic pressed spheronized granulated particles are disintegrated.

The spheronized granulated particles obtained after the cold isostatic pressing step may be present in the form of agglomerated particles due to pressurization. Thus, the agglomerated particles are subjected to a disintegration step to separate them from one another. When the agglomerated particles are separated into individual particles through the disintegration step, a uniform particle size distribution can be obtained to improve the uniformity of the active material.

In the disintegration step, the agglomerated particles may be disintegrated with ease merely by applying a slight level of shear force to the agglomerated spheronized granulated particles. The disintegration process is not particularly limited. For example, the disintegration may be carried out by using an agitator having agitation blades, or by using a known mill, such as a conventional jet mill, a vibration mill, a pin mill, a hammer mill, or the like.

After that, the disintegrated spheronized granulated particles are mixed with pitch, and the resultant product is carbonized at 1,400-1,600° C. to carry out carbon coating.

In the carbon coating step, the surfaces of spheronized granulated particles disintegrated from the preceding step are mixed homogeneously with pitch as a carbon coating material so that the carbon coating material may be attached to the surfaces of the disintegrated spheronized granulated particles, and then the resultant product is carbonized to form carbon coating layers on the surfaces of the disintegrated spheronized granulated particles. Herein, pitch forms coating layers on the surfaces of the spheronized granulated particles so that the scaly graphite particles forming the spheronized granulated particles may be further bound to one another. In this manner, it is possible to prevent degradation of the stability of the spheronized granulated particles that may occur during repeated charge/discharge cycles.

The carbon coating material, pitch, may be currently used solid pitch or liquid pitch. For example, the solid pitch may be obtained by pulverizing coal tar pitch, petroleum pitch, synthetic pitch, wood tar pitch, or the like. The liquid pitch may be obtained by dissolving a liquid resin or solid pitch in a solvent to carry out coating, and carbonizing the resultant product. Herein, particular examples of the solvent include hexane, toluene, tetrahydrofuran (THF), quinoline, N-methyl pyrrolidone (NMP), ethanol, or the like.

According to an embodiment of the present disclosure, the solid pitch may have an average particle diameter of 1-7 μm, or 2-4 μm. When the average particle diameter of solid pitch satisfies the above-defined range, it can be distributed homogeneously among the active material particles and mixed therewith to accomplish more homogeneous coating on the surfaces of the active material particles.

Herein, the carbon coating material, pitch, may be used in an amount of 1-10 parts by weight, or 3-5 parts by weight, based on 100 parts by weight of the disintegrated spheronized granulated particles. When the amount of the carbon coating layers satisfies the above-defined range, it is possible to prevent the problem of degradation of electrical properties, caused by the formation of an excessively thick coating layer, or the problem of degradation of life efficiency, caused by the formation of an excessively thin coating layer and the exfoliation of a coating layer during charge/discharge cycles. It is also possible to improve the stability of the spheronized granulated particles during repeated charge/discharge cycles, and to improve rapid charge/discharge characteristics.

The method for mixing the surfaces of the disintegrated spheronized granulated particles with the carbon coating material is not particularly limited, and any method generally known to those skilled in the art may be used. For example, the mixing may be carried out by using mechanical and chemical processes, such as a kneader, such as a two-roll, a blade, a mechano micro-system, extruder, a ball mill, a planetary mill, a mechano-fusion system, Nobilta, a hybridization or a rotary ball mill, or by using a spray drying process or an emulsifying process.

After the carbon coating material is mixed homogeneously with the disintegrated spheronized granulated particles as described above, the resultant mixture is carbonized at a temperature of 1,100-1,600° C. Herein, the carbonization may be carried out for 18-30 hours. According to an embodiment of the present disclosure, the carbonization is carried out at a temperature of 1,400-1,600° C. for 20-26 hours so that carbon coating layers may be formed on the disintegrated spheronized granulated particles. The formed carbon coating layers may include amorphous or crystalline carbon. When the carbonization condition is satisfied, the carbon coating material may be stabilized sufficiently, impurities in the carbon coating material may be removed completely, degeneration of the coated surface properties of carbon coating material at high temperature may be prevented, and battery swelling caused by an increase in swelling of a negative electrode may be prevented.

In still another aspect of the present disclosure, there is provided a negative electrode including the negative electrode active material.

Particularly, the negative electrode according to an embodiment of the present disclosure includes a current collector, and a negative electrode active material layer disposed on at least one surface of the current collector and including the negative electrode active material according to an embodiment of the present disclosure.

The electrode layer may be formed by coating slurry for a negative electrode active material layer, prepared by dispersing the negative electrode active material according to the present disclosure, a binder and a conductive material in a solvent, on at least one surface of a current collector, followed by drying and pressing.

The current collector is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used. Although the current collector is not particularly limited in its thickness, it may have a thickness of 3-500 µm.

The negative electrode active material may be used in an amount of 80-99 wt % based on the total weight of the negative electrode slurry composition.

The binder is an ingredient which assists the binding between the conductive material and the active material, or the binding to the current collector, and is generally used in an amount of 0.1-20 wt % based on the total weight of the negative electrode slurry composition. Particular examples of the binder include polyvinylidene fluoride-co-hexafluoropropylene (PVDF-co-HFP), polyvinylidene fluoride, polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylate, styrene butadiene rubber (SBR), lithium polyacrylate (Li-PAA), or the like. More particularly, lithium polyacrylate can impart higher adhesion as compared to the other binders, such as SBS/CMC, when it is used for a negative electrode including an active material having a high silicon content of about 80%. By virtue of the above-mentioned characteristic, lithium polyacrylate is advantageous in that it is possible to accomplish high capacity retention during charge/discharge, when lithium polyacrylate is used for a Si-based negative electrode.

The conductive material is not particularly limited, as long as it causes no chemical change in the corresponding battery and has conductivity. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; conductive materials, such as polyphenylene derivatives, or the like. The conductive material may be added in an amount of 0.1-20 wt %, based on the total weight of the negative electrode slurry composition.

The dispersion medium may include water or an organic solvent, such as N-methyl-2-pyrrolidone (NMP), and may be used in such an amount that the negative electrode slurry including the negative electrode active material optionally with a binder and a conductive material may have a desired level of viscosity.

In addition, there is no particular limitation in the coating process of the negative electrode slurry, as long as it is a method used currently in the art. For example, a coating process using a slot die may be used. In addition to this, a Mayer bar coating process, a gravure coating process, a dip coating process, a spray coating process, etc. may be used.

In still another aspect of the present disclosure, there is provided a lithium secondary battery including the negative electrode. Particularly, the lithium secondary battery may be obtained by injecting a lithium salt-containing electrolyte to an electrode assembly including a positive electrode, the above-described negative electrode, and a separator interposed between the positive electrode and the negative electrode.

The positive electrode may be obtained by mixing a positive electrode active material, a conductive material, a binder and a solvent to form slurry and coating the slurry directly onto a metal current collector, or casting the slurry onto a separate support, peeling a positive electrode active material film from the support and laminating the film on a metal current collector.

The positive electrode active material used in the positive electrode active material layer may be any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), or a mixture of at least two of them.

Meanwhile, the same conductive material, binder and solvent as used for manufacturing the negative electrode may be used.

The separator may be a conventional porous polymer film used conventionally as a separator. For example, the porous polymer film may be a porous polymer film made of a polyolefinic polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used without particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3 CF_2(CF_3)_2 CO^-$, $(CF_3SO_2)_2 CH^-$, $(SF_5)_3 C^-$, $(CF_3SO_2)_3 C^-$, $CF_3(CF_2)_7SO_3^-$, $CF_3 CO_2^-$, $CH_3 CO_2^-$, $SCN^-$, and $(CF_3 CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, and tetrahydrofuran.

Particularly, among the carbonate-based organic solvents, ethylene carbonate and propylene carbonate, which are cyclic carbonates, are organic solvents having a high viscosity and a high dielectric constant, and thus may be used preferably, since they can dissociate the lithium salt in the electrolyte with ease. When such a cyclic carbonate is used after mixing it with a linear carbonate having a low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, a cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked type battery, a wound type battery, a stacked and folded type battery or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size device include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(Preparation of Spheronized Carbonaceous Negative Electrode Active Material)

Scaly graphite having an average particle diameter of 200 μm was prepared and pulverized by using an air jet mill. The pulverized scaly graphite was subjected to a spheronization process to obtain spheronized granulated particles. Then, the resultant spheronized granulated particles were introduced to a mold of a cold isostatic press (CIP) machine, all sides of the mold were filled with water, and then cold isostatic pressing was carried out under a molding pressure of 90 Mpa for 100 seconds. After that, the cold isostatic pressed spheronized granulated particles were disintegrated.

Then, 100 parts by weight of the disintegrated spheronized granulated particles were mixed with 5 parts by weight of pitch (solid pitch) as a carbon coating material, and the resultant mixture was carbonized at a temperature of 1,500° C. for 24 hours by using a ball mill to obtain carbon-coated spheronized granulated particles. In this manner, a spheronized carbonaceous negative electrode active material having the average particle diameter and minimum particle diameter as shown in the following Table 1 was obtained.

(Manufacture of Negative Electrode)

The spheronized carbonaceous negative electrode active material obtained as described above, Super C65 as a conductive material, styrene butadiene rubber (SBR) as a binder and carboxymethyl cellulose (CMC) as a thickener were mixed at a weight ratio of 96.6:1:1.3:1.1, and water was added thereto to prepare negative electrode slurry. The resultant slurry was applied to copper foil and vacuum dried at a temperature of about 130° C. for 10 hours to obtain a negative electrode having an area of 1.4875 $cm^2$. Herein, the negative electrode was prepared with a loading amount of 3.61 $mAh/cm^2$.

(Manufacture of Coin-Type Secondary Battery)

The negative electrode obtained as described above was used as a working electrode and Li metal cut into an area of 1.7671 $cm^2$ was used as a counter electrode. In addition, a porous polyethylene separator was interposed between the working electrode and the counter electrode to form an electrode assembly. Then, ethylene carbonate (EC) was mixed with diethyl carbonate (DEC) at a volume ratio of 1:4, and 0.5 wt % of vinylene carbonate (VC) as an additive for non-aqueous electrolyte and 1 M $LiPF_6$ were added to the mixed solvent to prepare a non-aqueous electrolyte. The electrode assembly was received in a coin-type casing and the non-aqueous electrolyte was injected thereto to obtain a coin-type half-cell secondary battery.

Example 2

A spheronized carbonaceous negative electrode active material, a negative electrode and a secondary battery were obtained in the same manner as Example 1, except that scaly graphite was pulverized by using an air jet mill so that the resultant negative electrode active material might have the average particle diameter as shown in the following Table 1.

Example 3

A spheronized carbonaceous negative electrode active material, a negative electrode and a secondary battery were obtained in the same manner as Example 1, except that scaly graphite was pulverized by using an air jet mill so that the resultant negative electrode active material might have the tap density (increased sphericity) as shown in the following Table 1.

Comparative Example 1

A spheronized carbonaceous negative electrode active material was obtained in the same manner as Example 1, except that carbon coating was carried out through carbonization at a temperature of 1,250° C. so that the resultant negative electrode active material might have the average particle diameter and the minimum particle diameter as shown in the following Table 1.

In addition, a negative electrode and a secondary battery were obtained in the same manner as Example 1, except that the negative electrode active material obtained as described above was used.

Comparative Example 2

A spheronized carbonaceous negative electrode active material was obtained in the same manner as Example 1, except that carbon coating was carried out through carbonization at a temperature of 1,250° C. so that the resultant negative electrode active material might have the average particle diameter and the minimum particle diameter as shown in the following Table 1.

In addition, a negative electrode and a secondary battery were obtained in the same manner as Example 1, except that the negative electrode active material obtained as described above was used.

Comparative Example 3

A spheronized carbonaceous negative electrode active material was obtained in the same manner as Example 1, except that carbon coating was carried out through carbonization at a temperature of 1,250° C. and cold isostatic pressing was carried out for 400 seconds so that the resultant negative electrode active material might have the average particle diameter and the minimum particle diameter as shown in the following Table 1.

In addition, a negative electrode and a secondary battery were obtained in the same manner as Example 1, except that the negative electrode active material obtained as described above was used.

Comparative Example 4

A spheronized carbonaceous negative electrode active material was obtained in the same manner as Example 1, except that 100 parts by weight of the disintegrated spheronized granulated particles was mixed with 20 parts by weight of pitch (solid pitch) as a carbon coating material, and carbon coating was carried out through carbonization at a temperature of 3,000° C. so that the resultant negative electrode active material might have the average particle diameter and the minimum particle diameter as shown in the following Table 1.

In addition, a negative electrode and a secondary battery were obtained in the same manner as Example 1, except that the negative electrode active material obtained as described above was used.

Comparative Example 5

A spheronized carbonaceous negative electrode active material was obtained in the same manner as Example 1, except that pulverized scaly graphite was subjected merely to the spheronization process so that the resultant negative electrode active material might have the average particle diameter and the minimum particle diameter as shown in the following Table 1.

In addition, a negative electrode and a secondary battery was obtained in the same manner as Example 1, except that the negative electrode active material obtained as described above was used.

Test Methods and Results

Average Particle Diameter of Negative Electrode Active Material

Each of the negative electrode active materials according to Examples 1-3 and Comparative Examples 1-5 was dispersed in a dispersion medium (10 wt % dispersion of sodium hexametaphosphate $(NaPO_3)_6$ in water), and then introduced to a laser diffraction particle size analyzer (Microtrac S3500) to measure a difference in diffraction pattern depending on particle size, when the negative electrode active material particles pass through laser beams, and then particle size distribution was calculated. Then, $D_{50}$, average particle diameter, was determined by calculating the particle diameter at the point of 50% in the particle number accumulated distribution depending on particle diameter in the analyzer system. In addition, the minimum particle diameter $(D_{min})$ was determined by calculating the particle diameter at the point of the smallest particle diameter in the particle number accumulated distribution depending on particle diameter in the analyzer system.

Tap Density (g/cc) of Negative Electrode Active Material

The tap density of each of the negative electrode active materials according to Examples 1-3 and Comparative Examples 1-5 was analyzed by using a tap density measuring instrument, such as SEISHIN TAPDENSER KYT-400.

Swelling Characteristics

Each of the secondary batteries according to Examples 1-3 and Comparative Examples 1-5 was determined for the swelling ratio after 30 charge/discharge cycles by subjecting each battery to the first charge/discharge cycle at 0.1 C, to the second and the third charge/discharge cycles at 0.2 C, and then to the fourth to the thirtieth charge/discharge cycles at 0.5 C under the conditions of a charge/discharge voltage of 4.35-2.75V and a cut-off current of 0.005 C. The results are shown in the following Table 1.

Herein, the swelling ratio (%) is defined by the following formula.

Swelling ratio (%)=[(Electrode thickness after charge/discharge cycles−Initial electrode thickness)/(Initial electrode thickness)]×100

High-Temperature Storage Characteristics

After each of the secondary batteries according to Examples 1-3 and Comparative Examples 1-5 was stored at 60° C. at 100% of SOC (state-of-charge) for 4 weeks, it was charged/discharged under the conditions of a voltage of 4.25-3.0V and 0.33 C with a cut-off current of 0.05 C to determine the capacity retention. The results are shown in the following Table 1.

Herein, the capacity retention (%) is defined by the following formula.

Capacity retention (%)=[(Capacity after high-temperature storage)/(Initial capacity)]×100

Initial Efficiency

Each of the coin-type secondary batteries according to Examples 1-3 and Comparative Examples 1-5 was charged to 0.005V in a constant current (CC) mode of 0.1 C at 25° C. and then charged in a constant voltage (CV) mode to carry out the first charge to a charge current of 0.005 C (cut-off current). Then, each battery was allowed to stand for 10 minutes and discharged to 1.5V in a constant current (CC) mode of 0.1 C. Herein, charge capacity (a) and discharge capacity (b) were determined, and the initial efficiency was calculated according to the following formula.

Initial efficiency (%)=[Discharge capacity $(b)$]/[Charge capacity $(a)$]×100

Rapid Charge Characteristics (3 C Li-Plating Test SOC (%))

When a secondary battery is charged at a current of 1 C or higher, lithium is deposited at a specific point. Herein, the point of lithium deposition is represented by SOC (%) to evaluate the rapid charge characteristics of the secondary battery.

Each of the coin-type secondary batteries according to Examples 1-3 and Comparative Examples 1-5 was subjected to three charge/discharge cycles at 0.1 C, and then charged in a CC mode at 3 C for 15 minutes. The discharge capacity of the third 0.1 C cycle was taken as SOC of 100, and charge capacities in a CC mode was divided by the capacity at SOC of 100 and converted into SOC values. The SOC values were marked on the X-axis. Then, voltage values (Y-axis) were differentiated based on X-axis capacity values (dV/dQ), and the X-axis SOC point corresponding to the knee point of the X-axis was found and marked as Li plating SOC.

TABLE 1

| | Average particle diameter of negative electrode active material ($D_{50}$) (μm) | Minimum particle diameter of negative electrode active material ($D_{min}$) (μm) | Tap density of negative electrode active material (g/cc) | Swelling characteristic of secondary battery (%) | Rapid charge characteristics (3C Li-plating test SOC(%)) | Initial efficiency (%) | High-temperature storage capacity retention of secondary battery (%) |
|---|---|---|---|---|---|---|---|
| Ex. 1 | 10 | 2.8 | 1.04 | 22 | 43 | 92.1 | 97.5 |
| Ex. 2 | 8.5 | 2.8 | 1.04 | 22 | 44 | 92.0 | 97.1 |
| Ex. 3 | 10 | 2.8 | 1.20 | 21 | 43 | 92.4 | 97.6 |
| Comp. Ex. 1 | 9 | 1.9 | 1.06 | 24 | 41 | 91.3 | 96.4 |
| Comp. Ex. 2 | 11 | 2.3 | 1.01 | 25 | 37 | 91.5 | 96.5 |
| Comp. Ex. 3 | 12 | 2.3 | 1.00 | 25 | 37 | 91.4 | 96.4 |
| Comp. Ex. 4 | 8 | 1.9 | 1.09 | 30 | 39 | 93.1 | 97.0 |
| Comp. Ex. 5 | 12.4 | 2.5 | 1.21 | 25 | 37 | 91.7 | 96.4 |

As can be seen from Table 1, each of the secondary batteries using the negative electrode active materials according to Examples 1-3 shows improved results of swelling characteristics, rapid charge characteristics, initial efficiency and high-temperature storage capacity retention characteristics, as compared to the secondary batteries using the negative electrode active materials according to Comparative Examples 1-5.

What is claimed is:

1. A spheronized carbonaceous negative electrode active material, having an average particle diameter ($D_{50}$) of 8.5 μm to 10.5 μm, a minimum particle diameter ($D_{min}$) of 2.3 μm to 2.8 μm, and a tap density of 1.00 g/cc to 1.20 g/cc.

2. The spheronized carbonaceous negative electrode active material according to claim 1, having an average particle diameter ($D_{50}$) of 8.5 μm to 10 μm.

3. The spheronized carbonaceous negative electrode active material according to claim 1, having a tap density of 1.04/cc to 1.20 g/cc.

4. The spheronized carbonaceous negative electrode active material according to claim 1, having a sphericity of 0.82 to 0.98.

5. A method for preparing the spheronized carbonaceous negative electrode active material as defined in claim 1, comprising the steps of:

spheronizing scaly graphite to prepare spheronized granulated particles;

carrying out cold isostatic pressing of the spheronized granulated particles to form cold static pressed spheronized granulated particles;

disintegrating the cold isostatic pressed spheronized granulated particles; and mixing the disintegrated spheronized granulated particles with pitch to form a mixture, and carbonizing the mixture at a temperature ranging from 1,400° C. to 1,600° C. to form a carbon coating on the disintegrated spheronized granulated particles.

6. The method for preparing the spheronized carbonaceous negative electrode active according to claim 5, wherein the scaly graphite is crudely pulverized scaly graphite obtained by pulverizing scaly graphite having an average particle diameter of 9.5 μm to 300 μm.

7. The method for preparing the spheronized carbonaceous negative electrode active according to claim 6, wherein the pitch is used in an amount of 1 part by weight to 10 parts by weight based on 100 parts by weight of the disintegrated spheronized granulated particles.

8. A negative electrode, comprising:
a current collector, and
a negative electrode active material layer on at least one surface of the current collector,
wherein the negative electrode active material layer comprises the spheronized carbonaceous negative electrode active material as defined in claim 1.

9. A lithium secondary battery including the negative electrode as defined in claim 8.

10. The spheronized carbonaceous negative electrode active material according to claim 1, wherein the spheronized carbonaceous negative electrode active material comprises spheronized scaly natural graphite.

11. The spheronized carbonaceous negative electrode active material according to claim 1, wherein the spheronized carbonaceous negative electrode active material comprises carbon-coated spheronized scaly natural graphite.

12. The spheronized carbonaceous negative electrode active material according to claim 2, having a tap density of 1.04/cc to 1.20 g/cc.

* * * * *